US007421304B2

(12) United States Patent
Sato

(10) Patent No.: US 7,421,304 B2
(45) Date of Patent: Sep. 2, 2008

(54) AUDIO SIGNAL PROCESSING DEVICE, SIGNAL RECOVERING DEVICE, AUDIO SIGNAL PROCESSING METHOD AND SIGNAL RECOVERING METHOD

(75) Inventor: Yasushi Sato, Nagareyama (JP)

(73) Assignee: Kenwood Corporation, Tokyo (JP)

( * ) Notice: Subject to any disclaimer, the term of this patent is extended or adjusted under 35 U.S.C. 154(b) by 760 days.

(21) Appl. No.: 10/248,297

(22) Filed: Jan. 7, 2003

(65) Prior Publication Data

US 2003/0138110 A1 Jul. 24, 2003

(30) Foreign Application Priority Data

Jan. 21, 2002 (JP) ............................ 2002-012191
Jan. 21, 2002 (JP) ............................ 2002-012196

(51) Int. Cl.
*G06F 17/00* (2006.01)

(52) U.S. Cl. ........................................................ 700/94

(58) Field of Classification Search ................... 381/98, 381/19–23, 61, 94.1–94.3; 700/94; 704/207–208, 704/229–230
See application file for complete search history.

(56) References Cited

U.S. PATENT DOCUMENTS 5,687,191 A * 11/1997 Lee et al. .................... 375/216
2002/0172395 A1* 11/2002 Foote et al. ................. 382/100
2004/0148159 A1* 7/2004 Crockett et al. ............. 704/211
2004/0165730 A1* 8/2004 Crockett ...................... 381/56

FOREIGN PATENT DOCUMENTS

| | | |
|---|---|---|
| JP | 59-77498 | 5/1984 |
| JP | 02-162569 | 6/1990 |
| JP | 07-287599 | 10/1995 |
| JP | 08-063197 | 3/1996 |
| JP | 09-171396 | 6/1997 |
| JP | 11-122204 | 4/1999 |
| JP | 2001-100796 | 4/2001 |
| JP | 2001-312300 | 11/2001 |
| JP | 2001-320337 | 11/2001 |
| JP | 2002-517920 | 6/2002 |

* cited by examiner

*Primary Examiner*—Vivian Chin
*Assistant Examiner*—Lun-See Lao
(74) *Attorney, Agent, or Firm*—Jianq Chyun IP Office

(57) ABSTRACT

The pitch extracting part generates a pitch waveform signal in a manner making the time interval of the pitch of the input audio sound data to be the same. After the number of samples in each region is made to be the same by the re-sampling part, the pitch waveform signal is changed into a subband data that express a time-varying-strength of a basic frequency composition and a higher harmonic composition by the subband analyzing part. The subband data are superimposed by a modulation wave composition that expresses attaching data of an attaching object by the data attaching part and is regarded as a bit stream to output through a nonlinear quantizing. A portion expressing the higher harmonic composition that is made corresponding to the audio sound expressed by this audio sound data in the subband data are deleted by the encoding part.

8 Claims, 11 Drawing Sheets

Replacement Sheet

AUDIO SIGNAL PROCESSING DEVICE, SIGNAL RECOVERING DEVICE, AUDIO SIGNAL PROCESSING METHOD AND SIGNAL RECOVERING METHOD

CROSS REFERENCE TO RELATED APPLICATIONS

This application claims the priority benefit of Japanese application serial no. 2002-012191, filed on Jan. 21, 2002 and no. 2002-012196, filed on Jan. 21, 2002.

BACKGROUND OF INVENTION

1. Field of the Invention

This invention relates in general to an audio signal processing device, a signal recovering device, an audio signal processing method and a signal recovering method.

2. Description of Related Art

Recently, an audio sound that is compounded by a regulation-compounding technique or an editing-compounding technique is widely used. These techniques compound audio sound by connecting the audio sound constructing elements (such as audio sound elements).

Generally speaking, a compound audio sound is used after it is suitably embedded with an attaching information by an electronic watermark technique. In order to discriminate a compound audio sound and a real-person-made-audio sound or in order to identify a speaker who makes an audio sound element serving as a compound audio sound element or a composer who makes the compound audio sound. The attaching information is embedded into the compound audio sound to show the originality and/or the composing right of the compound audio sound.

The electronic watermark is produced by using an effect that approaches frequency with high strength composition and ignores that with small strength with respect to human hearing (a masking effect). More specifically, it is produced by approaching frequency with a high strength composition while deleting a composition that is smaller than this composition and inserting an attaching signal that occupies a band same as the deleted composition in the spectrum of a compound audio sound.

Moreover, the inserted attaching signal is generated in advance by modulating a carrier wave with a frequency around the upper limit of the band occupied by the compound audio sound through using an attaching information.

Regarding the techniques of identifying the speaker who makes an element of a compound audio sound such as an audio sound element and recognizing the originality and/or the composing right of the compound audio sound, a method is provided to encrypt the data that express the audio sound element and to maintain a decryption key only for the speaker or the right of the composer of the compound audio sound.

However, in the above electronic watermark technique, when the compound audio sound that is inserted by an attaching signal is compressed, the content of the attaching signal will be damaged due to compression, and the attaching signal cannot be recovered. Additionally, when the compound audio sound is further sampled, the composition created by a carrier wave for generating an attaching signal will be regarded as a foreign sound that is audible. A compound audio sound is usually used after it has been compressed, so by using the above electronic watermark technique, the attaching signal attached to the compound audio sound usually cannot be properly reproduced.

Regarding a method for encrypting data that express an element of a compound audio sound such as an audio sound element, it is difficult for a person who does not have a decryption key for these data to use these data. Moreover, with this technique, when the quality of the compound audio sound is very high, discrimination cannot be made between a compound audio sound and an audio sound that is made by a real person.

SUMMARY OF INVENTION

It is therefore an object of the present invention to provide an audio signal processing device and an audio signal processing method for embedding an attaching information to an audio sound and even if the audio sound is compressed, the attaching information is easy to be extracted.

Another object of the present invention to provide a signal recovering device and an audio signal recovering method for extracting an embedded attaching information by using such an audio signal processing device and an audio signal processing method.

A further object of the present invention is to provide an audio signal processing device and an audio signal processing method so that information of an audio sound can be processed in a manner capable of identifying the speaker who makes the audio sound without encrypting the information of the audio sound even if the arrangement of the audio sound constructing element is changed.

The invention provides an audio signal processing device comprising: a subband extracting means for generating a subband signal that expresses a time-varying-strength of a basic frequency composition and a higher harmonic composition of an audio signal of a processing object that express a waveform of an audio sound; a data attaching means for generating an information-attached subband signal expressing a result of superimposing an attaching signal that expresses an attaching information of an attaching object to the subband signal that has been generated by the subband extracting means; and a deleting means for generating a deleted subband signal that expresses a result of deleting a portion expressing a time-varying higher harmonic composition of a deleting object that is made corresponding to the audio sound in the subband band signal generated by the subband extracting means.

A corresponding relationship between each audio sound made by a specific speaker and the higher harmonic composition of the deleting object made corresponding to each audio sound can be particularly owned by the speaker.

The audio signal processing device can further comprise a filtering means for substantially deleting a composition with a frequency that is at or over a predetermined frequency in the basic frequency composition and the higher harmonic composition expressed by the subband signal by filtering the subband signal that has been generated by the subband extracting means.

In this condition, the data attaching means can generate the information-attached subband signal by superimposing the attaching signal occupying a band that is with or over the predetermined frequency to the filtered subband signal.

The data attaching means can superimpose the attaching signal to a result of nonlinearly quantizing the filtered subband signal.

The data attaching means can obtain the information-attached subband signal and determine a quantization characteristic of the nonlinear quantizing according to a data amount of the obtained information-attached subband signal and practice the nonlinearly quantizing corresponding to the determined quantization characteristic.

The deleting means can store a table that can be changed and that expresses the corresponding relationship and generate the deleted subband signal according to the corresponding relationship that is expressed by the table stored by itself.

The deleting means can generate the deleted subband signal that expresses the result of deleting the portion expressing the time-varying higher harmonic composition of the deleting object that is made correspond to the audio sound in a linearly quantized one that is a linear quantization of the filtered subband signal.

The deleting means can obtain the deleted subband signal and determine a quantization characteristic of the nonlinear quantizing according to the data amount of the obtained deleted subband signal and produce the nonlinear quantizing according to the determined quantization characteristic.

The audio signal processing device can comprise a removing means for specifying a portion that expresses a fricative in the audio signal of the processing object and removing the specified portion out of an object that deletes a portion expressing a time-varying higher harmonic composition of the deleting object.

The audio signal processing device can comprise a pitch waveform signal generating means for obtaining the audio signal of the processing object and processing the audio signal into a pitch waveform signal by making the time interval of the region correspond to the unit pitch of the audio signal.

In this condition, the subband extracting means can generate the subband signal according to the pitch waveform signal.

The subband extracting means can comprise a variable filter for extracting the basic frequency composition of the audio sound of the processing object by making a frequency characteristic change according to a control and filtering the audio signal of the processing object; a filter characteristic determining means for specifying the basic frequency of the audio sound according to the basic frequency composition that has been extracted from the variable filter and controlling the variable filter with a frequency characteristic that masks a composition out of a portion near to the specified basic frequency; a pitch extracting means for dividing the audio signal of the processing object into a region constructed by the audio signal in the unit pitch according to the basic frequency composition of the audio signal; and a pitch length fixing part for generating a pitch waveform signal with each time interval within the region substantially the same by sampling each region of the audio signal of the processing object with substantially the same number of samples.

The audio signal processing device can comprise a pitch information output means for generating and outputting a pitch information in order to specify an original time interval of each region of the pitch waveform signal.

The invention provides a signal recovering device comprising: an information-attached subband signal obtaining means for obtaining an information-attached subband signal that expresses a result of superimposing an attaching signal expressing an attaching information of an attaching object to a subband signal that expresses a time-varying-strength of a basic frequency composition and a higher harmonic composition of an audio signal of a processing object that expresses a waveform of an audio sound; and an attaching information extracting means for extracting the attaching information from the obtained information-attached subband signal.

The invention provides an audio signal processing method comprising: generating a subband signal that expresses a time-varying-strength of a basic frequency composition and a higher harmonic composition of an audio signal of a processing object that expresses a waveform of an audio sound; generating an information-attached subband signal that expresses a result of superimposing an attaching signal expressing an attaching information of an attaching object to the generated subband signal; and generating a deleted subband signal that expresses a result of deleting a portion expressing a time-varying higher harmonic composition of a deleting object that is made corresponding to the audio sound in the generated subband signal.

The invention provides a signal recovering method comprising: obtaining an information-attached subband signal that expresses a result of superimposing an attaching signal expressing an attaching information of an attaching object to a subband signal that expresses a time-varying-strength of a basic frequency composition and a higher harmonic composition of an audio signal of an processing object that expresses a waveform of an audio sound; and extracting the attaching information from the obtained information-attached subband signal.

BRIEF DESCRIPTION OF DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DETAILED DESCRIPTION

Figure 1:
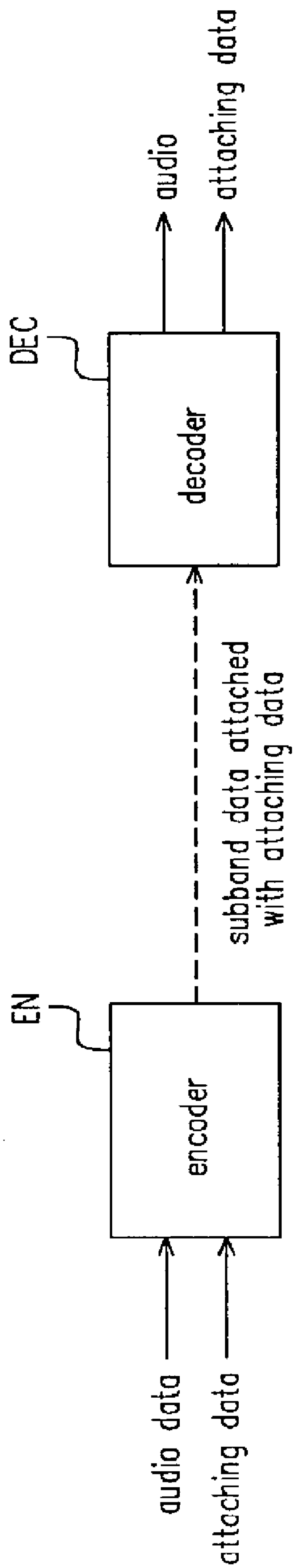
FIG. 1 is a block diagram showing a structure of an audio sound data application system related to an embodiment of the present invention.

The audio sound data application system serves as an example of the embodiment of the present invention and is explained referring to the drawings as follows.

This audio sound data application system is provided with an encoder EN and a decoder DEC as shown in FIG. 1. The encoder EN adds the attaching data to the audio sound expression data. The decoder DEC removes these attaching data form the data that has been added with the attaching data.

The attaching data can be composed of any data, and more specifically can include the audio sound that is expressed by the object data added with these attaching data or the information for identifying the speaker who makes this audio sound.

Figure 2:
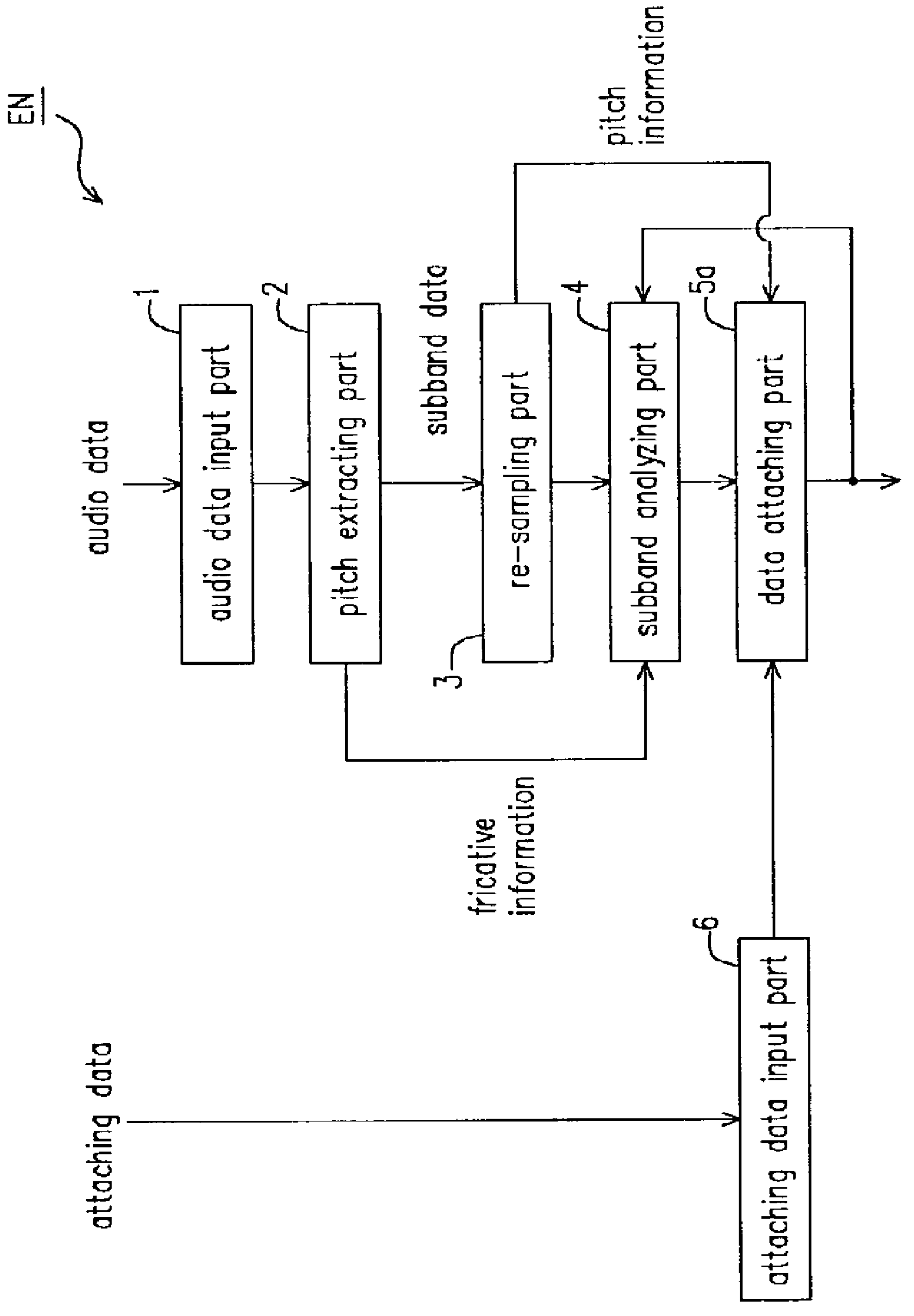
FIG. 2 is a block diagram showing a structure of the encoder.

FIG. 2 is a schematic drawing showing the structure of the encoder EN. The encoder EN comprises an audio sound data input part 1, a pitch extracting part 2, a re-sampling part 3, a subband analyzing part 4, a data attaching part 5*a* and an attaching data input part 6 as shown in FIG. 2.

Next, an audio sound data decoder serves as an example and will be explained referring to the drawings.

Figure 3:
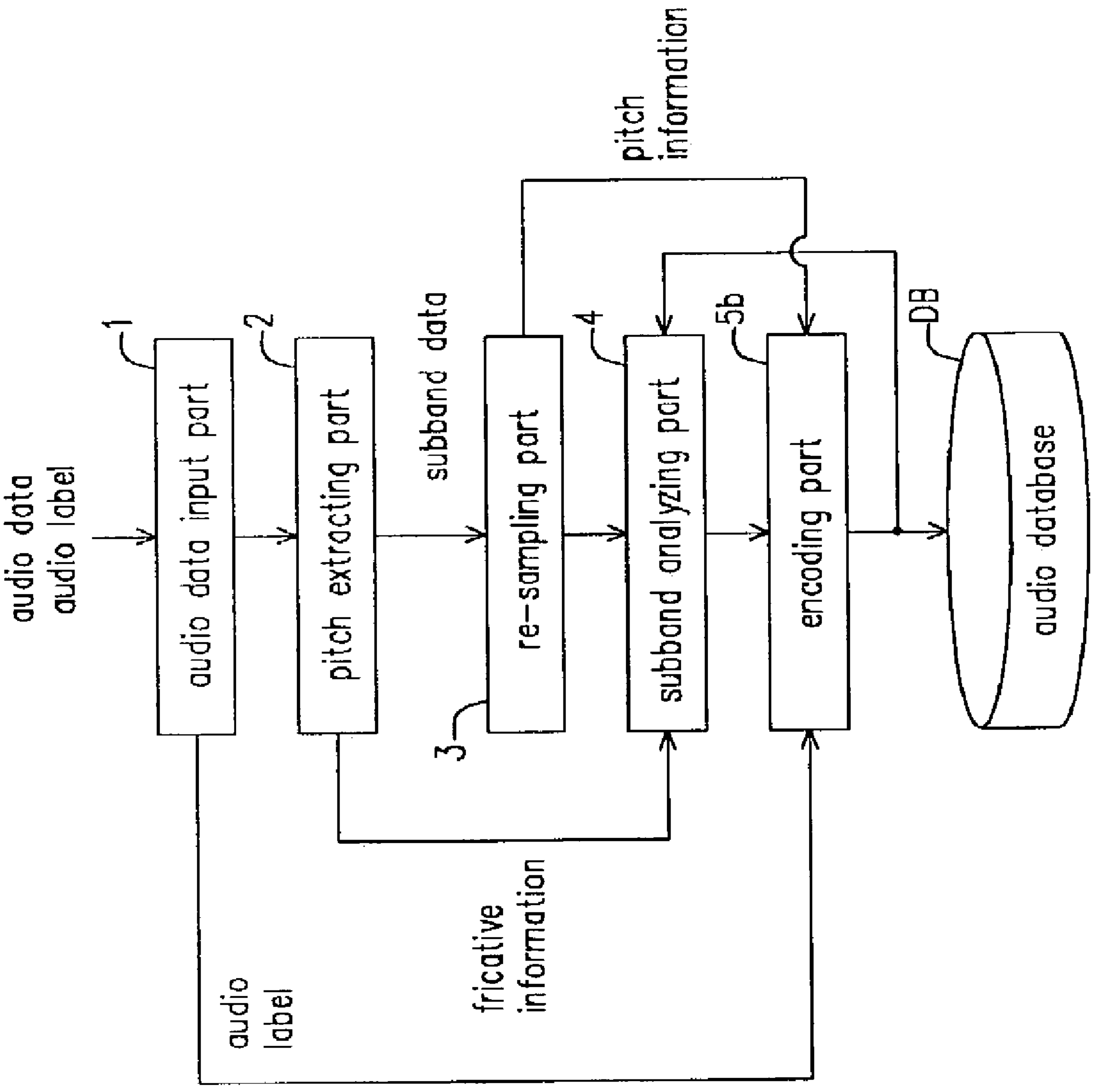
FIG. 3 is a block diagram showing a structure of the encoder.

FIG. 3 is a schematic drawing showing the structure of this audio sound data decoder. This audio sound data decoder comprises an audio sound data input part 1, a pitch extracting part 2, a re-sampling part 3, a subband analyzing part 4 and an encoding part 5*b* as shown in FIG. 3.

The audio sound data input part 1 for example comprises a recording medium driver for reading the data that is recorded on a recording medium (such as a flexible disc or a MO, i.e. Magneto Optical disk), a processor such as a CPU (Central Processing Unit), a memory such as a RAM (Random Access Memory).

The audio sound data input 1 treats the attaching data that is to be added as the object data and obtains the audio sound data that express the waveform of the audio sound and then supplies it to the pitch extracting part 2.

The audio sound data input part 1 obtains the audio sound data that express the waveform of the audio sound element as one audio sound constructing unit and obtains the audio sound label as data for identifying the audio sound element expressed by this audio sound data. The obtained audio sound data are then supplied to the pitch extracting part 2 and the obtained audio sound label is supplied to the encoding part 5*b*.

Moreover, the audio sound data has a form of digital signal that is modulated by PCM (Pulse Code Modulation) and expresses the sampled audio sound in a predetermined period much shorter than the audio sound pitch.

Any of the pitch extracting part 2, the re-sampling part 3, the subband analyzing part 4, the data attaching part Sa and the encoding part 5*b* comprises a processor such as a DSP (Digital Signal Processor) and a CPU (Central Processing Unit) and a memory such as a RAM (Random Access Memory).

With only one processor or only one memory, a partial function or a whole function of the audio sound data input part 1, the pitch extracting part 2, re-sampling part 3, the subband analyzing part 4, the data attaching part 5*a* and the encoding part 5*b* can be produced.

Figure 4:
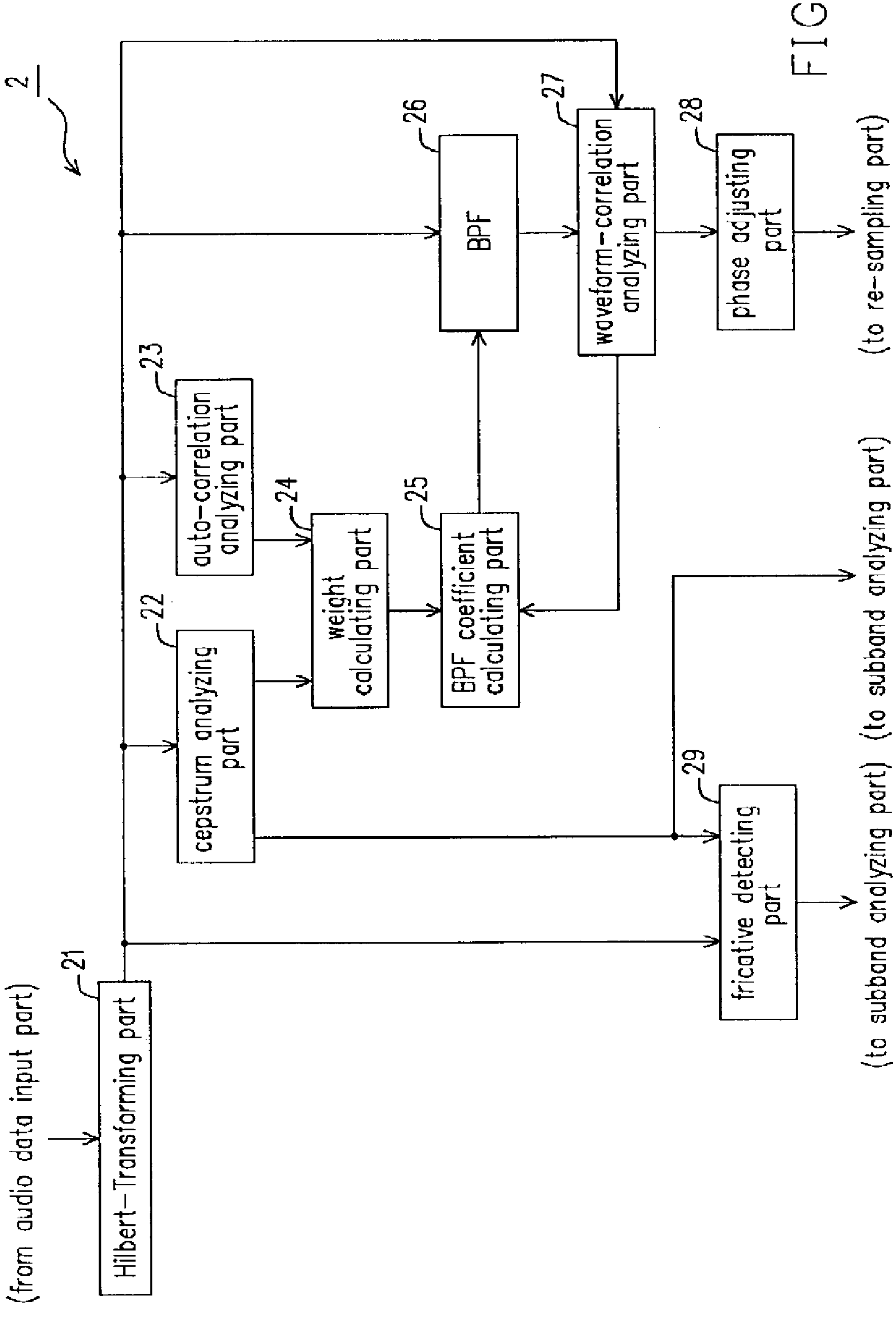
FIG. 4 is a block diagram showing a structure of the pitch extracting part.

The pitch extracting part 2 is functionally constructed by a Hilbert-Transforming part 21, a cepstrum analyzing part 22, an auto-correlation analyzing part 23, a weight calculating part 24, a BPF (Band Pass Filter) coefficient calculating part 25, a band pass filter 26, a waveform-correlation analyzing part 27, a phase adjusting part 28 and a fricative detecting part 29, as shown in FIG. 4.

Moreover, with only one processor or only one memory, a partial function or a whole function of the Hilbert-Transforming part 21, the cepstrum analyzing part 22, the auto-correlation analyzing part 23, the weight calculating part 24, the BPF coefficient calculating part 25, the band pass filter 26, the waveform-correlation analyzing part 27, the phase adjusting part 28 and the fricative detecting 29 can be produced.

The Hilbert-Transforming part 21 obtains the transformation result by Hilbert-Transforming the audio sound data that is supplied through the audio sound data input part 1. According to the obtained result, the time to interrupt the audio sound that is expressed by this audio sound data are specified. By dividing this audio sound data into portions corresponding to the time that has been specified, the audio sound data are divided into a plurality of regions. And then the divided audio sound data are supplied to the cepstrum analyzing part 22, the auto-correlation analyzing part 23, the band pass filter 26, the waveform-correlation analyzing part 27, the phase adjusting part 28 and the fricative detecting part 29.

Moreover, the Hilbert-Transforming part 21 can also specify the time when the Hilbert-Transformation result of the audio sound data are minimum, as the break time for interrupting the audio sound that is expressed by these audio sound data.

The cepstrum analyzing part 22 makes a cepstrum analysis for the audio sound data supplied from the Hilbert-Transforming part 21. In this way, the audio sound basic frequency and the audio sound formant frequency expressed by these audio sound data are specified. And then the data expressing the specified basic frequency is generated and supplied to the weight calculating part 24. The data expressing the specified formant frequency are generated and supplied to the fricative detecting part 29 and the subband analyzing part 4 (and more specifically to the latter mentioned compression ratio setting part 46).

Specifically, when the audio sound data are supplied from the Hilbert-Transforming part 21, the cepstrum analyzing part 22 first obtains the spectrum of these audio sound data by using Fast-Fourier-Transformation (or by using another method that generates the data expressing the result of the Fourier-Transforming of discreteness variables).

Next, the strength of each obtained spectrum is converted into the value respectively corresponding to the logarithm of the original value (the base number of the logarithm can be any one, for example the common logarithm can be used).

Next, the cepstrum analyzing part 22 obtains the result (i.e. cepstrum) of the reverse-Fourier-Transforming of the spectrum that has been transformed by using Fast-reverse-Fourier-Transformation (or by using another method that generates the data expressing the result of the reverse-Fourier-Transforming of discreteness variables).

According to the obtained cepstrum, the cepstrum analyzing part 22 specifies the audio sound basic frequency expressed by this cepstrum and generates the data that express the specified basic frequency and then supplies it to the weight calculating part 24.

Specifically, for example, by filtering (i.e. re-filtering) the obtained cepstrum, the cepstrum analyzing part 22 can also extract the frequency composition (long composition) with a quefrence that is at or over a predetermined value in this cepstrum and specify the basic frequency according to a peak position of the extracted long composition.

Moreover, for example, by re-filtering the obtained cepstrum, the cepstrum analyzing part 22 can extract the composition (short composition) with a quefrence that is at or less than a predetermined value in this cepstrum. According to the peak position of the extracted short composition, the formant frequency is specified and the data that express the obtained formant frequency are generated and then supplied to the fricative detecting part 29 and the subband analyzing part 4.

When the audio sound data are supplied by the hear belt converting part 21, according to the auto-correlation function of the waveform of the audio sound data, the auto-correlation analyzing part 23 can specify the audio sound basic frequency that is expressed by this audio sound data and generate the data that express the specified basic frequency and then supply it to the weight calculating part 24.

Specifically, first when the audio sound data are supplied by the hear belt converting part 21, the auto-correlation analyzing part 23 can specify the auto-correlation function r(1) expressed by the right side of the formula 1.

$$r(1) = \frac{1}{N}\sum_{t=0}^{N/1}\{x(t+1)\cdot x(t)\}$$ [formula 1]

(wherein N represents the total number of the samples of the audio sound data, x(α) represents the sample value that is the α-th one count from the beginning of the audio sound data).

Next, the auto-correlation analyzing part 23 can specify the minimum value that exceeds the predetermined lower limit as the basic frequency within the frequency that gives the maximum value of the function (periodogram) for obtaining the transformation result by Fourier-Transforming the auto-correlation function r(1) and generates the data that express the specified basic frequency, and then supply it to the weight calculating part 24.

When the data that express the basic frequency are respectively supplied from the cepstrum analyzing part 22 and the auto-correlation analyzing part 23 to amount two, the weight calculating part 24 obtains the average of the absolute value of the reciprocal number of the basic frequency that is expressed by these two data. The data that express the obtained value (i.e. average peak length) are generated and supplied to the BPF coefficient calculating part 25.

When the data that express the average peak length are supplied from the weight calculating part 24 and when the zero cross signal (that will be described latter) is supplied from the waveform-correlation analyzing part 27, the BPF coefficient calculating part 25 judges whether the average pitch, pitch signal and zero-cross period differ from each other such that the difference is or over a predetermined amount according to the supplied data or the zero-cross signal. When it is judged that no difference is or over the predetermined amount, the frequency characteristic of the band pass filter 26 is controlled in a manner such that the reciprocal number of the zero-cross period is regarded as the central frequency (the central frequency of the passing band of the band pass filter 26). On the other hand, when it is judged that the difference is at or over the predetermined amount, the frequency characteristic of the band pass filter 26 is controlled in a manner such that the reciprocal number of the average pitch length is regarded as the central frequency.

The band pass filter 26 is functional as the FIR (Finite Impulse Response) type of filter capable of changing the central frequency.

Specifically, the band pass filter 26 sets its central frequency to be the value that obeys the control of the BPF coefficient calculating part 25. The audio sound data supplied from the Hilbert-Transforming part 21 are filtered and then the filtered audio sound data (pitch signal) are supplied to the waveform-correlation analyzing part 27. The pitch signal comprises the digital-type data with a sampling interval same as that of the audio sound data.

Moreover, the bandwidth of the band pass filter 26 is such that the upper limit of the passing bandwidth of the band pass filter 26 is always settled within two times of the audio sound basic frequency expressed by the audio sound data.

The waveform-correlation analyzing part 27 specifies the time, i.e., the moment (the zero-cross moment) when the instantaneous value of the pitch signal supplied from the band pass filter 26 comes to zero, and supplies the signal (zero-cross signal) that expresses the specified time to the BPF coefficient calculating part 25.

However, the waveform-correlation analyzing part 27 can also specify the time i.e. the moment when the instantaneous value of the pitch signal comes not to zero but to a predetermined value and can replace the signal that expresses the specified time by the zero-cross signal to supply to the BPF coefficient calculating part 25.

Moreover, when the audio sound data are supplied from the Hilbert-Transforming part 21, the waveform-correlation analyzing part 27 divides these audio sound data by the time interval arriving the boundary of the unit period (one period, for example) of the pitch signal supplied from the band pass filter 26. Regarding each region capable of being divided, the correlation between the various phases of the audio sound data that are made within this region and the pitch signal within this region is obtained, and the phase of the audio sound data at the time when the highest correlation happens is specified to be the phase of the audio sound data within this region.

Specifically, for example, the waveform-correlation analyzing part 27 obtains the value cor that is expressed by the right side of the formula 2 regarding various values of ϕ that expresses the phase (ϕ is an integer that is or over zero) in respective regions. The waveform-correlation analyzing part 27 specifies the ψ, which makes the cor become maximum, as the ϕ, and generates the data that express value ψ and treats these data as the phase data expressing the phase of the audio sound data within this region to supply to the phase adjusting part 28.

$$cor = \sum_{i=1}^{n}\{f(i-\phi)\cdot g(i)\}$$ [formula 2]

(wherein N represents the total number of the samples within the region, f(β) represents the β-th one count from the beginning of the audio sound data within the region, and g(γ) represents the sample value of the γ-th one count from the beginning of the pitch signal within the region.)

Moreover, the interval of the region is expected to be one pitch. In the case when the region is longer this problem occurs: the number of samples within the region increases so that the data amount of the pitch-waveform data (that will be described latter) increases, or that the sampling interval increases so that the audio sound expressed by the pitch-waveform data becomes incorrect.

When the audio sound data are supplied from the Hilbert-Transforming part 21 and the data, which express the phase ψ of each region of the audio sound data, are supplied from the waveform-correlation analyzing part 27, the phase adjusting part 28 shifts the phase of the audio sound data of various regions in a manner equaling to the phase ψ of this region expressed by the phase data. And then the shifted audio sound data (pitch-waveform data) are supplied to the re-sampling part 3.

The fricative detecting part 29 judges whether the audio sound data input to the encoder EN represents a fricative. In the case when it is judged that it represents a fricative, information (the fricative information) showing that this audio sound data are fricative will be supplied to the blocking part 43 (that will be described latter) of the subband analyzing part 4.

The waveform of the fricative has the feature that it includes not much basic frequency composition or higher harmonic composition at one side with wide spectrum like white noise. Therefore, the fricative detecting part 29 can also judge, for example, whether the ratio of the higher harmonic strength to the total strength of the object audio sound that is to be attached with the attaching data or the object audio sound to be encoded is at or less than a predetermined ratio. In the case when it is judged that the ratio is at or less than a predetermined ratio, the audio sound data input to the encoder EN will be judged as representing a fricative. In the case when it is judged that the ratio exceeds the predetermined ratio, the audio sound data will be judged as not representing a fricative.

For obtaining the total strength of the object audio sound that is to be attached with the attaching data or the object audio sound that is to be encoded, more specifically, the fricative detecting part 29 obtains the audio sound data from the Hilbert-Transforming 21 for example. By FFT (Fast-Fourier-Transforming) (or by any other method for generating the data that express the Fourier-Transformation result of discreteness variables) the obtained audio sound data, the spectrum data that express the spectrum-distribution of this audio sound data are generated. According to the generated spectrum data, the strength of the higher harmonic composition (more specifically, the composition with frequency expressed by the data that is supplied by the cepstrum analyzing part 22) of this audio sound data are specified.

In this condition, when the fricative detecting part 29 judges that the audio sound data input to the encoder EN represent a fricative, the spectrum data that has been self-generated as above description can also be regarded as the fricative information and supplied to the blocking part 43.

Figure 5:
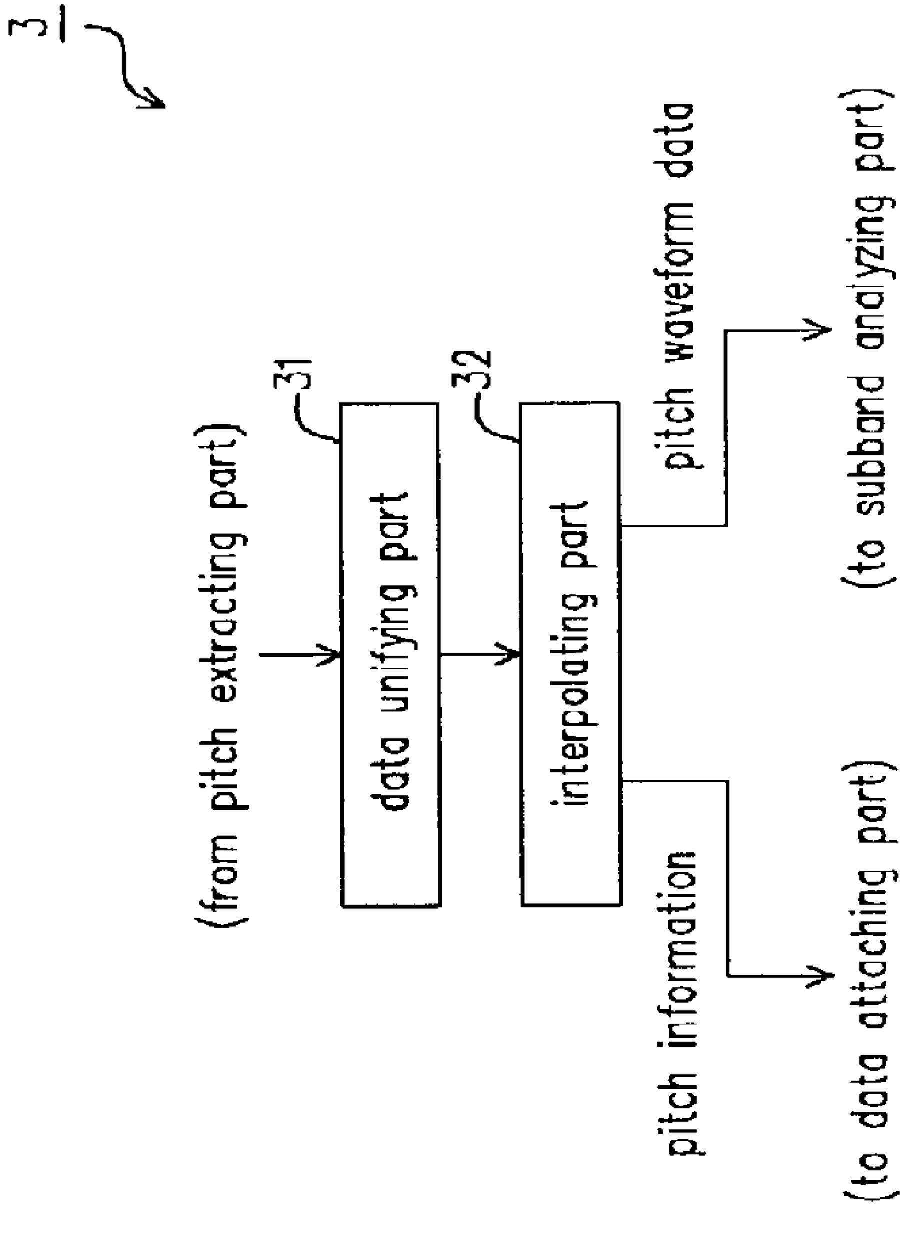
FIG. 5 is a block diagram showing a structure of the resampling part.
Figure 6:
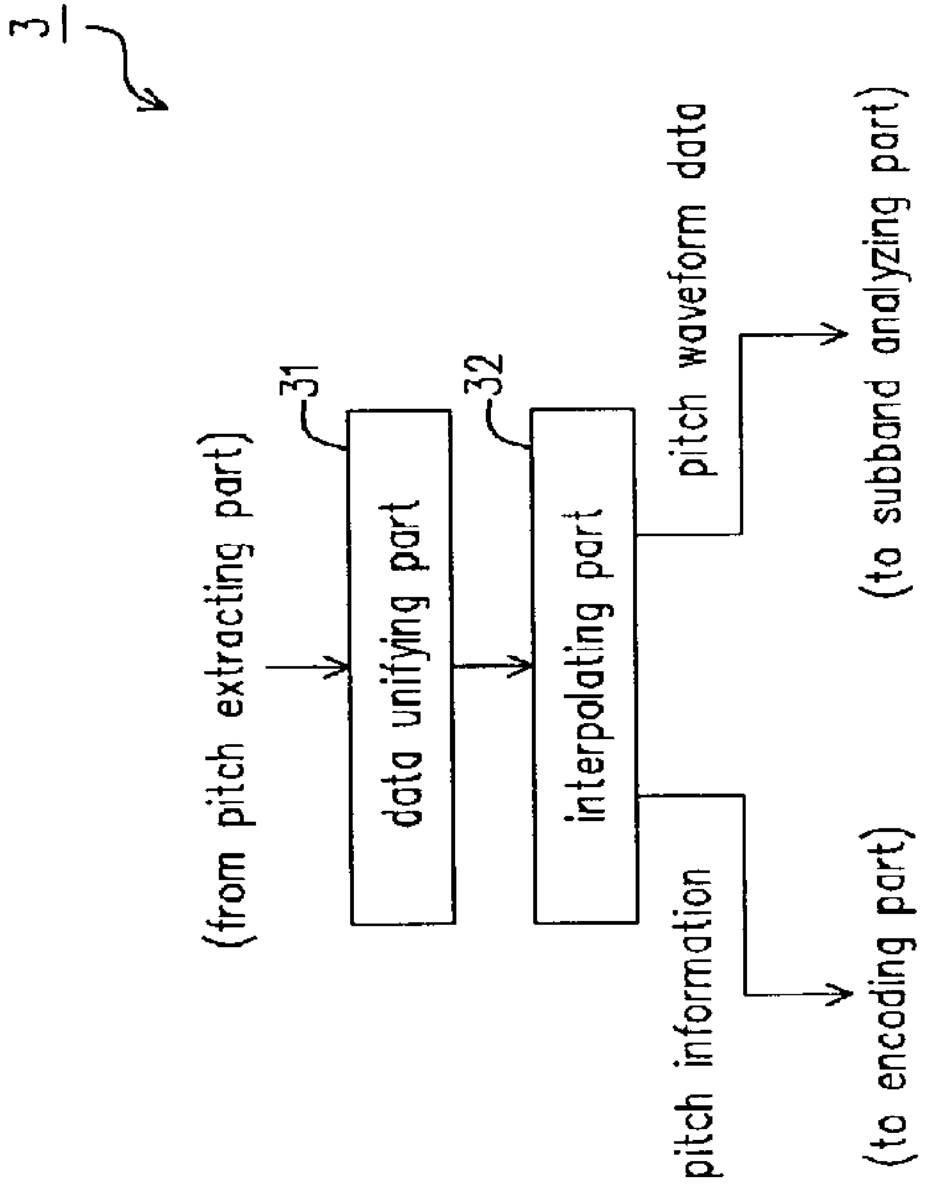
FIG. 6 is a block diagram showing a structure of the resampling part.

The re-sampling part 3 is functionally constructed by a data unifying part 31 and an interpolating part 32 as shown in FIGS. 5 and 6.

Moreover, with only one processor or only one memory, a partial or a whole function of the data unifying part 31 and the interpolating part 32 can be produced.

The data unifying part 31 obtains the correlation strength (more specifically, the magnitude of the correlation coefficient, for example) between the regions that include the pitch-waveform data supplied from the phase adjusting part 28 in each audio sound data and specifies the group of the regions with a correlation that is or over a predetermined degree of strength (more specifically, with the correlation coefficient that is or over a predetermined value) in each audio sound data. The sample value in the region belonging to the specified group is changed, and the waveform in each region belonging to this group is supplied to the interpolating part 32 such that the waveform within one region that represents this group is made to be substantially the same. Moreover, the data unifying part 31 can optionally determine the region that represents the group.

The interpolating part 32 samples and amends (re-samples) each region of the audio sound data supplied from the data unifying part 31 and supplies the re-sampled pitch-waveform data to the re-sampling analyzing part 4 (more specifically, the orthogonal converting part 41 that will be described latter).

However, in order to make the number of samples in each region of the audio sound data to be about the same constant, the interpolating part 32 re-samples the same region in an equal interval. The region, where the number of samples does not reach this constant, will be further added samples with the value for Lagrange-interpolating the adjoining sampling area on the time axis so that the number of samples in this region will be made same as this constant.

Moreover, the interpolating part 32 generates the data that express the original number of samples in each region and treats the generated data as the information (pitch information) that expresses the original pitch length in each region, and then supplies it to the data attaching part **5*a* (more specifically, the arithmetic coding part 52 that will be described latter) or the encoding part 56 (more specifically, the arithmetic coding part 52** that will be described latter).

Figure 7:
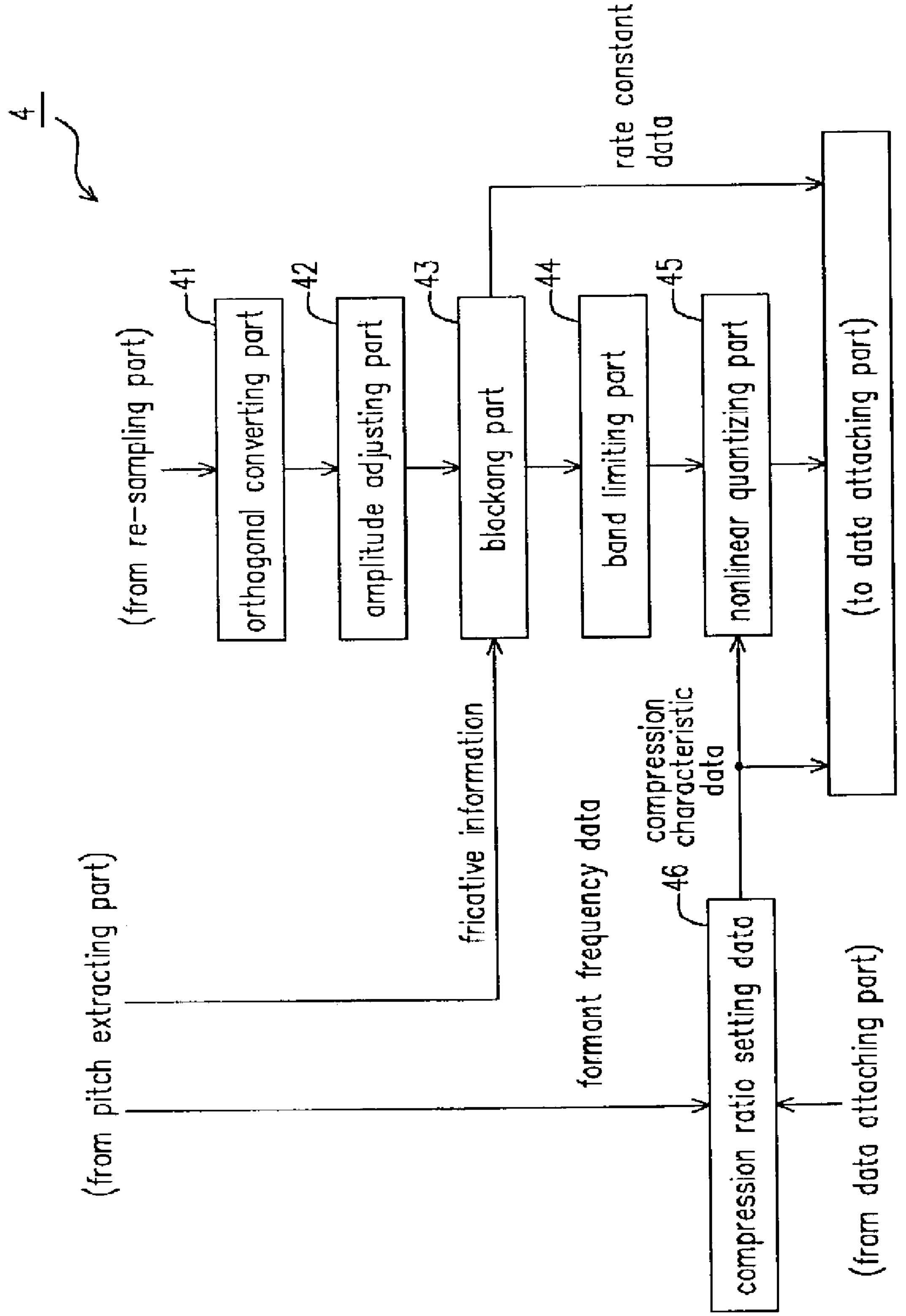
FIG. 7 is a block diagram showing a structure of the subband analyzing part.
Figure 8:
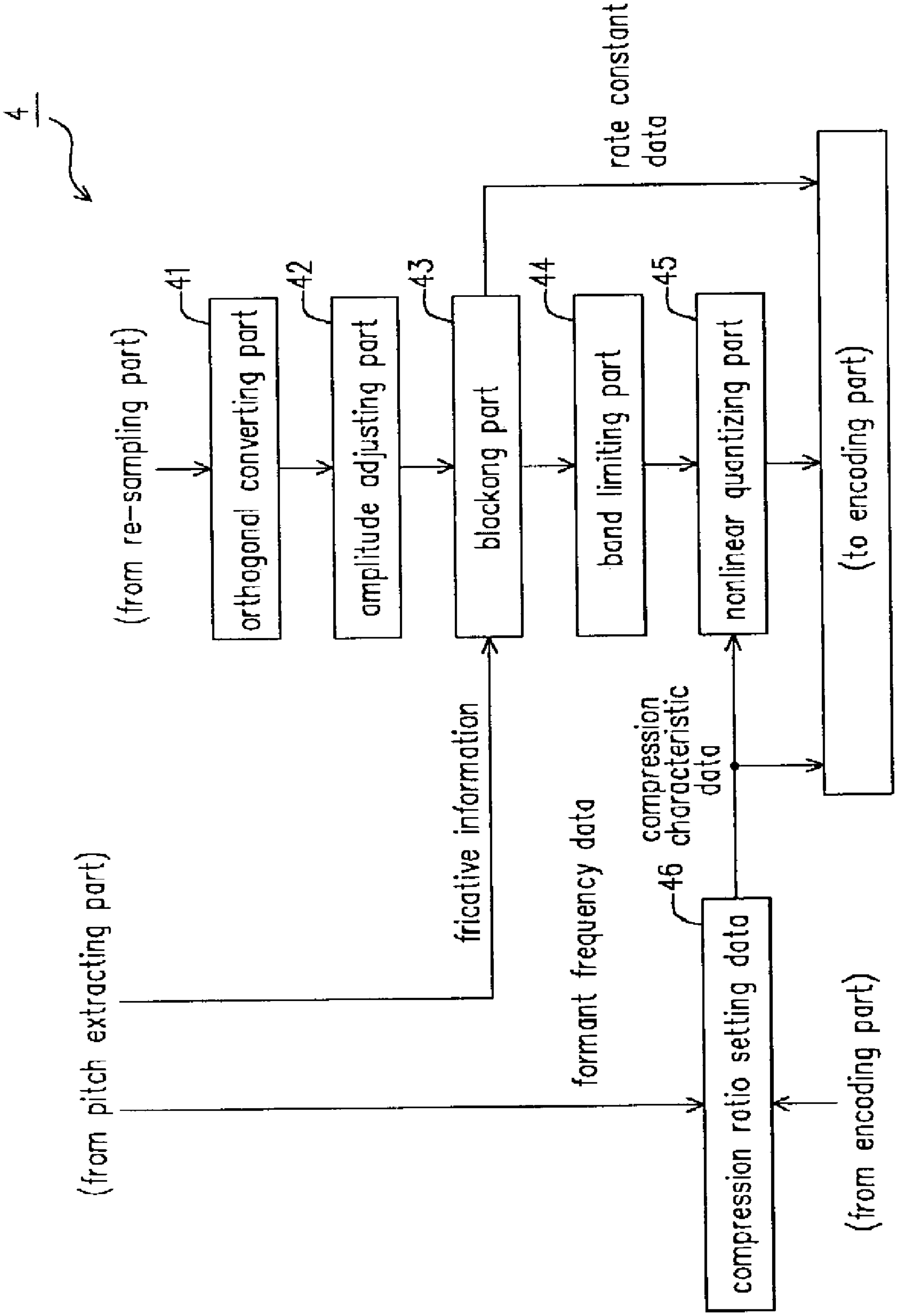
FIG. 8 is a block diagram showing a structure of the subband analyzing part.

The subband analyzing part 4 is functionally constructed by an orthogonal converting part 41, an amplitude adjusting part 42, a blocking part 43, a band limiting part 44, a nonlinear quantizing part 45 and a compression ratio setting part 46 as shown in FIGS. 7 and 8.

Moreover, with only one processor or only one memory, a partial or a whole function of the orthogonal converting part 41, the amplitude adjusting part 42, the blocking part 43, the band limiting part 44, the nonlinear quantizing part 45 and the compression ratio setting part 46 can also be produced.

By producing orthogonal transformation such as DCT (Discrete Cosine Transformation) to the pitch-waveform data supplied from the re-sampling part 3 (the interpolating part 32), the orthogonal converting part 41 generates the subband data and supplies the. generated subband data to the amplitude adjusting part 42.

The subband data include the data that express the time-varying-strength of the audio sound basic frequency composition expressed by the pitch-waveform data supplied to the subband analyzing part 4 and n data that express the time-varying-strength of n (n is a natural number) higher harmonic frequency composition of this audio sound. Therefore, when the strength of the audio sound basic frequency composition (or higher harmonic composition) does not vary with time, this strength of the basic frequency composition (or higher harmonic composition) is expressed in the direct current signal form.

When the subband data are supplied from the orthogonal converting part 41, by respectively multiplying (n+1) data constructing this subband data by a rate constant, the amplitude adjusting part 42 changes the strength of each frequency composition that is expressed by this subband data. The subband data with the changed strength are supplied to the blocking part 43 and the compression ratio setting part 46. Moreover, the rate constant data that express what value of the rate constant is multiplied to which number in which subband data are generated and supplied to the data attaching part **5*a* or the encoding part 5*b***.

The (n+1) rate constants that multiply (n+1) data included in one subband data determine the effective value of the strength of each frequency composition that is expressed by these (n+1) data to become a constant that unifies to each other. For example, in the case when the constant is J, the amplitude adjusting part 42 divides this constant J by an amplitude effective value K(k) in the region of the audio sound data that is the k-th one (k is an integer that is or over 1 and is or less (n+1)) in these (n+1) data to obtain the value {J/K(k)}. This value {J/K(k)} is a rate constant that multiplies the k th data.

When the subband data are supplied by the amplitude adjusting part 42, the blocking part 43 blocks this subband data into the one generated from the same audio sound data to supply to the band limiting part 44.

When the above fricative information, which shows that the audio sound expressed by these subband data is a fricative, is supplied by the fricative detecting part 29, then the blocking part 43 supplies the subband data to the band limiting part 44 is replaced by the blocking part 43 supplies this fricative information to the nonlinear quantizing part 45.

The band limiting part 44 is, for example, functional as a FIR-type digital filter that respectively filters the above (n+1)

data constructing the subband data supplied by the blocking part 43 and supplies the filtered subband data to the nonlinear quantizing part 45.

By the filtering of the band limiting part 44, in the (n+1) frequency composition that by the subband data (basic frequency composition or higher harmonic composition) with a the time-varying-strength, the composition that exceeds a predetermined cut-off frequency is substantially eliminated.

In the case when the filtered subband data are supplied by the band limiting part 44 or, in the case when the fricative information is supplied by the blocking part 43, the nonlinear quantizing part 45 nonlinearly compresses the instantaneous value of each frequency composition expressed by this subband data (or each composition strength of the spectrum expressed by the fricative information) to obtain a value (more specifically, the value is obtained by substituting each composition strength of the instantaneous value or the spectrum in the above convex function, for example) and generates subband data (or the fricative information) equal to the one obtained by quantizing this value. And then the generated subband data or the fricative information (the nonlinearly quantized subband data or the fricative information) is supplied to the data attaching part 5*a* (more specifically, the adding part 51*a* that will be described latter) or the encoding part 5*b* (the band deleting part 51*b* that will be described latter). The nonlinear quantized fricative information is supplied to the data attaching part 5*a* or the encoding part 5*b* under a condition that the fricative flag for identifying the fricative information is attached with.

Moreover, the nonlinear quantizing part 45 obtains the compression characteristic data from the compression setting part 46 in order to specify the relationship between the instantaneous value before and after compressing. The compression is produced according to the relationship specified from these data.

Specifically, for example, the nonlinear quantizing part 45 treats the data for specifying the function global_gain(xi) included in the right side of the formula 3 as the compression characteristic data and obtains it from the compression ratio setting part 46. A nonlinear quantization is produced by changing the instantaneous value of each frequency composition after it is nonlinearly compressed to substantially equal to the value of quantizing the function Xri(xi) that is expressed at right side of formula 3.

$$Xri(xi) = sgn(xi)\cdot|xi|^{4/3}\cdot 2^{[\mathrm{global\_gain}(xi)]/4} \quad \text{[formula 3]}$$

(wherein $\mathrm{sgn}(\alpha)=(\alpha/|\alpha|)$, 1 xi is the instantaneous value of the frequency composition that is expressed by the subband data supplied by the band limiting part 44, and global_gain(xi) for setting a full-scale).

The composition ratio setting part 46 generates the above compression characteristic data for specifying the relationship (compression characteristic, hereinafter) between the instantaneous values obtained from the nonlinear part 45 before and after compressing and supplies it to the quantizing part 45 and the arithmetic coding part 52 that will be described latter. Specifically, the compression ratio setting part 46 generates the compression characteristic data for specifying the above function global_gain(xi) and supplies it to the nonlinear quantizing part 45 and the arithmetic coding part 52, for example.

The compression setting part 46 is expected to determine the compression characteristic from the nonlinear quantizing part 45 in a manner that the data amount of the subband data after compressing is one percent (i.e. the compression ratio is one percent) of the data amount that is assumed to be quantized without being compressed by the nonlinear quantizing part 45.

In order to determine the compression characteristic, the compression ratio setting part 46 obtains the subband data that has been converted into an arithmetic code from the data attaching part 5*a* (more specifically, the arithmetic coding part 52 that will be described latter) or the encoding part 5*b* (more specifically, the arithmetic coding part 52). And then the ratio of the data amount of the subband data obtained from the amplitude adjusting part 42 to the data amount of the subband data obtained from the data attaching part 5*a* or the encoding part 5*b* is obtained. The ratio is judged whether it is greater than the target compression ratio (for example one percent). If the obtained ratio is judged as greater than the target compression ratio, the compression ratio setting part 46 will determine the compression characteristic in a manner smaller than the present compression ratio. On the other hand, if the obtained ratio is judged as equal or less than a target compression, the compression characteristic will be determined in a manner greater than the present compression ratio.

Moreover, the compression ratio setting part 46 can determine the compression characteristic in a manner that reduces the quality deterioration of the spectrum with high importance that will give feature to the audio sound expressed by the subband data of the object to be compressed. Specifically, for example, the compression ratio setting part 46 obtains the above data supplied by the cepstrum analyzing part 22 and determines the compression characteristic in a manner quantizing the data in a bit number substantially with the magnitude of the spectrum close to the formant frequency that is expressed by these data. The compression ratio setting part 46 can also quantize the frequency spectrum of the formant frequency within a predetermined range in a bit number greater than other spectrum to determine the compression characteristic.

Figure 9:
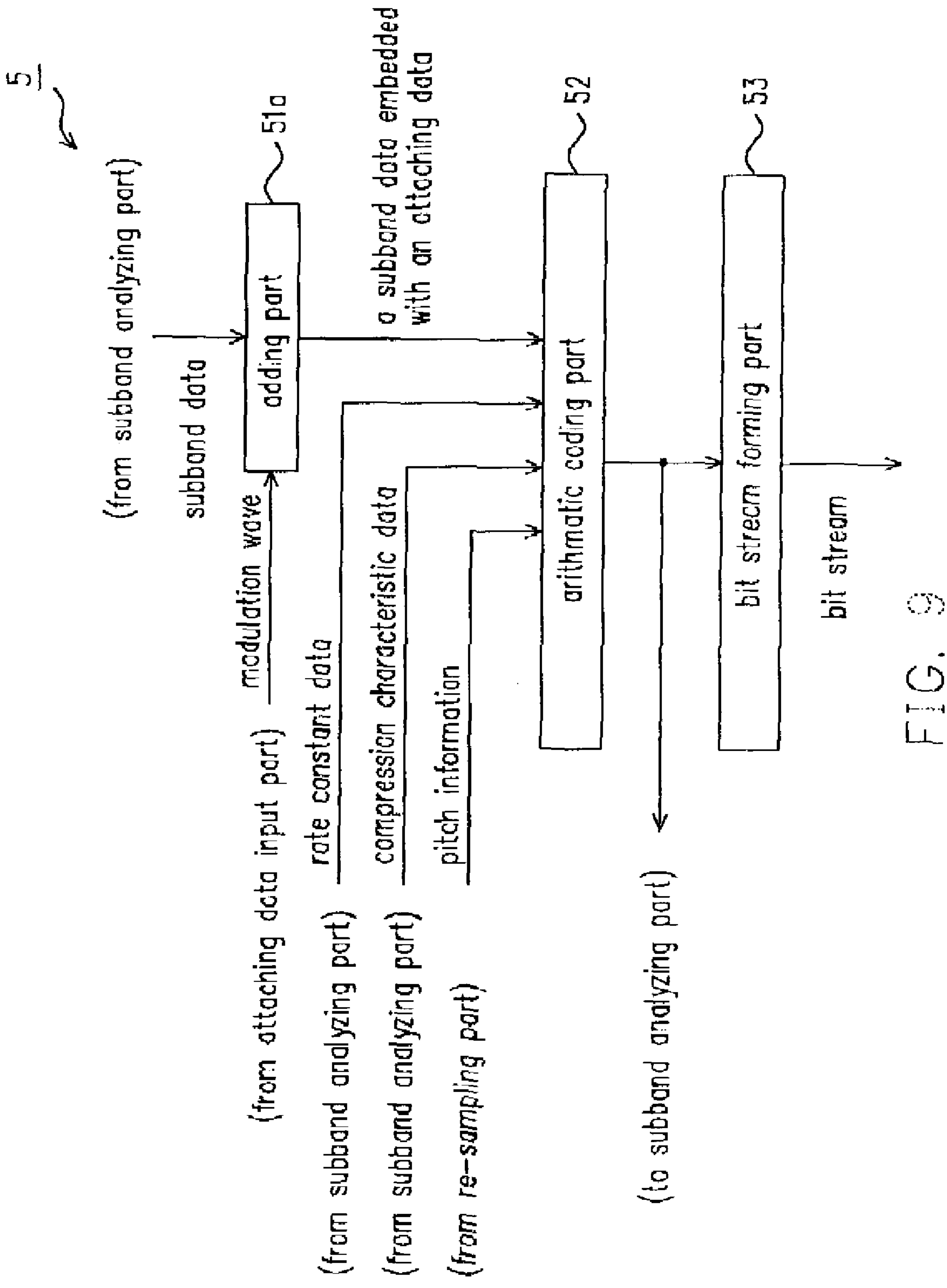
FIG. 9 is a block diagram showing a structure of the data attaching part.

The data attaching part 5*a* is functionally constructed by the adding part 51*a*, the arithmetic coding part 52 and a bit stream forming part 53, as shown in FIG. 9.

Moreover, with only one processor or only one memory, a partial or a whole function of the adding part 51*a*, the arithmetic coding part 52 and the bit stream forming part 53 can also be produced.

When nonlinearly quantized subband data or fricative information are supplied from the nonlinear quantizing part 45 and when a modulation wave that expresses the attaching data are supplied from the data attaching input part 6, the adding part 51*a* will judge whether a fricative flag is attached to a data supplied from the nonlinear quantizing part 45 (nonlinearly quantized subband data or a fricative information). If it is judged that no fricative flag is attached (i.e. the data are nonlinearly quantized subband data), a value of the modulation wave that expresses the attaching data are added to the instantaneous value of (n+1) data constructing this nonlinear quantized subband data. In this way, the attaching data are added to this subband data. And then the subband data attached with attaching data are supplied to the arithmetic coding part 52.

If the changing portion of the instantaneous value represents attaching data, the changing of the instantaneous value can be various. Which portion of the modulation wave that expresses attaching data is added to which frequency composition in the (n+1) frequency compositions can vary. The attaching data can also be added to a plurality of frequency compositions at the same time.

It is expected that the (n+1) frequency compositions expressed by the changed (n+1) data has its own bandwidth respectively and not to overlap each other. Therefore, it is expected that any one of bandwidths of these (n+1) frequency compositions is less than a half of the audio sound basic frequency that is expressed by these subband data.

On the other hand, if it is judged that a fricative flag is attached to the data supplied from the nonlinear quantizing part 45 (i.e. the data are nonlinearly quantized fricative information), the adding part 51*a* will supply this nonlinearly quantized fricative information to the arithmetic coding part 52 under the condition that the fricative flag is attached.

The arithmetic coding part 52 converts the subband data supplied from the adding part 51*a*, the pitch information supplied from the interpolating part 32, the rate constant data supplied from the amplitude adjusting part 42 and the compression characteristic data supplied from the compression ratio setting part 46 into arithmetic codes and supplies them to the compression ratio setting part 46 and the bit stream forming part 53.

Figure 10:
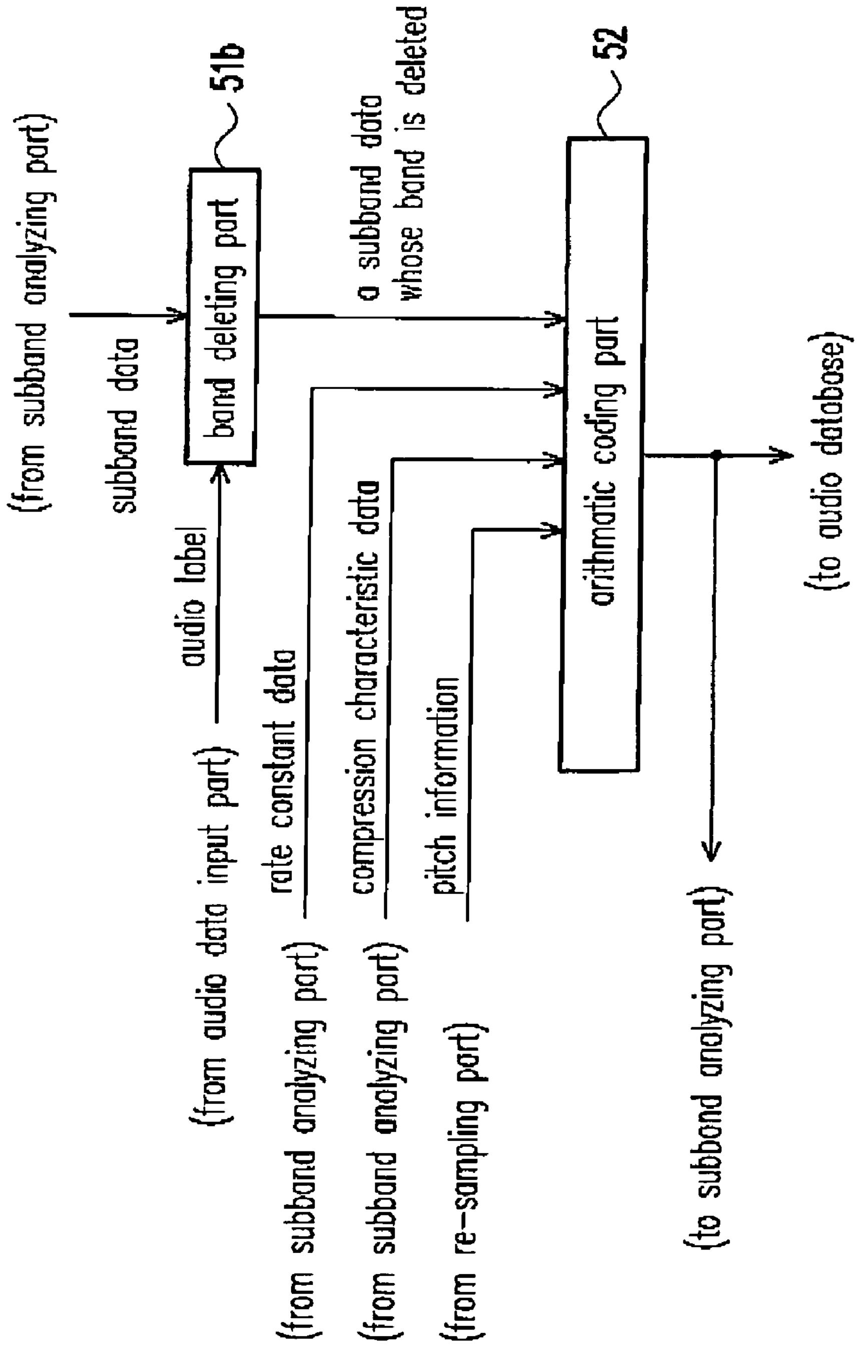
FIG. 10 is a block diagram showing a structure of the encoding part.

The encoding part 5*b* is functionally constructed by the band deleting part 51*b* and the arithmetic coding part 52, as shown in FIG. 10.

With only one processor or only one memory, a partial or a whole function of the band deleting part 51*b* and the arithmetic coding part 52 can also be produced.

The band deleting part 51*b* further comprises a nonvolatile memory such as a hard disc device or a ROM (Read Only Memory).

The band deleting part 51*b* stores a deleting band table for making an audio sound label and a deleting band assignment information that assigns a higher harmonic composition of the object to be deleted in the audio sound expressed by this audio sound label correspond to each other to be saved. One kind of audio sound with higher harmonic compositions can be an object to be deleted without any obstacle. Moreover, it is no obstacle that an audio sound exists without deleting a higher harmonic composition.

Therefore, when a nonlinear quantized subband data or fricative information are supplied from the nonlinear quantizing part 45 and when the modulation wave that expresses the audio sound label is supplied from the audio sound data input/output part 1, the band deleting part 51*b* will judge whether a fricative flag is attached to the data supplied from the nonlinear quantizing part 45 (a nonlinear quantized subband data or a fricative information). If it is judged that no fricative flag is attached (i.e., the data are nonlinear quantized subband data), the deleting band assignment information for corresponding to the supplied audio sound label will be specified. In the subband data supplied from the nonlinear quantizing part 45, the data that deletes the portion expressing the higher harmonic composition represented by the specified deleting band assignment information, and the audio sound label will be supplied to the arithmetic coding part 52.

On the other hand, if it is judged that a fricative flag is attached to the data supplied from the nonlinear quantizing part 45 (i.e. the data are nonlinear quantized fricative information), the band deleting part 51*b* will supply this nonlinearly quantized fricative information and the audio sound label to the arithmetic coding part 52 under the condition that a fricative flag is attached.

The arithmetic coding part 52 stores the audio sound database DB for saving the data (that will be described latter), such as a subband data, and is detachably connected to a nonvolatile memory such as a hard disc device or a flash memory.

The arithmetic coding part 52 converts the audio sound label and the subband data (or a fricative information) that are supplied from the band deleting part 51*b*, the pitch information supplied from the interpolating part 32, the rate constant data supplied from the amplitude adjusting part 42, the compression characteristic data supplied from the compression ratio setting part 46 into arithmetic codes, and then makes each arithmetic code compound to the same audio sound data to save in the audio sound database DB.

With the above operation, the audio sound data encoder converts audio sound data into a subband data and encodes the audio sound data by removing a predetermined higher harmonic composition from the subband data in each audio sound.

Therefore, if the deleting band table is made to be particularly owned by the speaker who makes the audio sound represented by the subband data that is stored in the audio sound database DB (or a specific person who owns this audio sound database DB), the speaker can be specified from the compound audio sound that is compounded by using the subband data stored in the database DB.

More specifically, this compound audio sound is separated into audio sound. Each audio that is obtained by separating is Fourier-Transformed. By specifying which higher harmonic composition each audio sound has removed, the corresponding relationship between each audio sound that is included in this compound audio sound and the higher harmonic composition that is removed from these audio sound can be specified. By specifying the deleting band table with a content not conflicting with the specified corresponding relationship, if the specified deleting band table is treated as the one that is particularly possessed by itself to specify the one that is being assigned, the one can specify a speaker who makes an audio sound applied to a compounding of a compound audio sound.

Therefore, if the compound audio sound includes many kinds of audio sound, no matter the passage content expressed by the compound audio sound or the arrangement of the audio sound is, the speaker who makes the audio sound for compounding this compound audio sound can be specified.

The bit stream forming part 53 generates a bit stream that expresses arithmetic codes supplied from the arithmetic coding part 52 and outputs it in a manner according to a RS232C standard, for example. Moreover, the bit stream forming part 53 can also be constructed by a controller circuit for controlling the serial communication with outside according to an RS232C standard.

The attaching data input part 6 can be constructed by a recording medium driver and a processor such as a CPU or a DSP, for example. Moreover, the function of the audio sound data input part 1 and the data attaching input part 6 can also be practiced by using the same reading medium driver.

Moreover, a processor for practicing a partial or a whole function of the pitch extracting part 2, the re-sampling part 3, the subband analyzing part 4 and the data attaching part Sa can also be used to practice the function of the data attaching input part 6.

The data attaching input part 6 obtains attaching data. The data that express the result of the modulating of the carrier wave from the obtained data are generated. The generated data (i.e. the modulation wave that expresses the attaching data) are supplied to the data attaching part 5*a* (more specifically, the adding part 51*a*). Moreover, the modulation type of the modulation wave that expresses the attaching data can be various, such as an amplitude modulation, an angle modulation and a pulse modulation.

Figure 11:
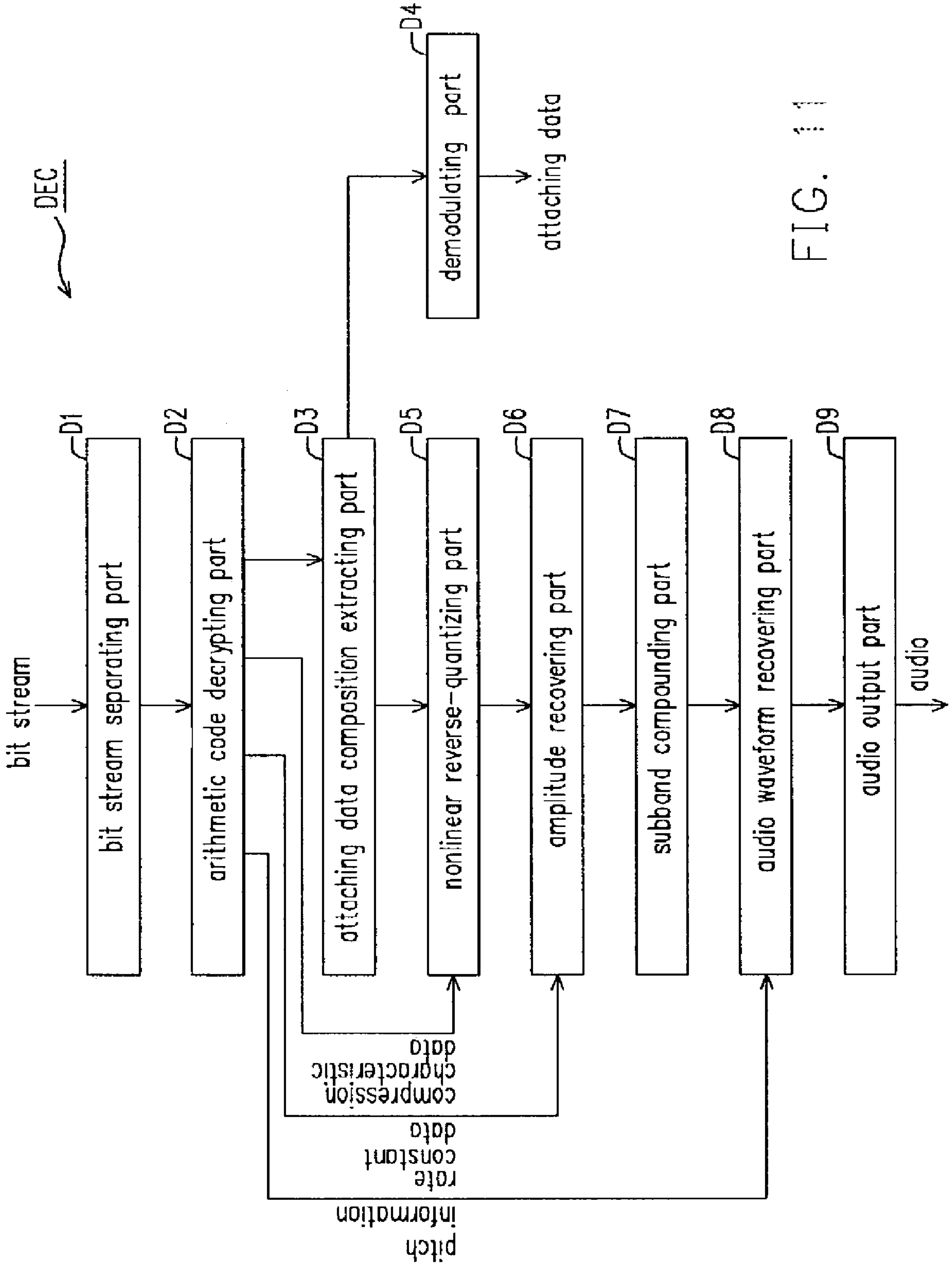
FIG. 11 is a block diagram showing a structure of the decoder.

FIG. 11 is a diagram showing the structure of the decoder DEC. The decoder DEC comprises a bit stream separating part D1, an arithmetic code decrypting part D2, an attaching data composition extracting part D3, a demodulating part D4, a nonlinear reverse-quantizing part D5, an amplitude recovering part D6, a subband compounding part D7, an audio sound waveform recovering part D8 and an audio sound output part D9 as shown in FIG. 11.

The bit stream separating part D1 comprises a control circuit for controlling the serial communication with outside according to an RS232C standard and a processor such as a CPU, for example.

The bit stream separating part D1 obtains a bit stream (or a bit stream that has the substantially same data structure as the bit stream generated by the bit stream forming part 53) that has been output through the encoder EN (more specifically, the bit stream forming part 53). The obtained bit stream is separated into arithmetic codes that express a subband data or a fricative information, a rate constant data, a pitch information and a compression characteristic data. The obtained arithmetic codes are supplied to the arithmetic code decrypting part D2.

Any one of the arithmetic code decrypting part D2, the attaching data composition extracting part D3, the demodulating part D4, the nonlinear reverse-quantizing part D5, the amplitude recovering part D6, the subband compounding part D7 and the audio sound waveform recovering part D8 is constructed by a processor such as a DSP or a CPU and a memory such as a RAM.

Moreover, with only one processor or only one memory, a partial or a whole function of the arithmetic code decrypting part D2, the attaching data composition extracting part D3, the demodulating part D4, the nonlinear reverse-quantizing part D5, the amplitude recovering part D6, the subband compounding part D7 and the audio sound waveform recovering part D8 can also be practiced. Such a processor can be further functional as the bit stream separating part D1.

By decrypting the arithmetic codes supplied from the bit stream separating part D1, the arithmetic code decrypting part D2 recovers the subband data (or the fricative information), the rate constant data, the pitch information and the compression characteristic data. The recovered subband data (or the fricative information) is supplied to the attaching data compression extracting part D3. The recovered compression characteristic data are supplied to the nonlinear reverse-quantizing part D5. The recovered rate constant data are supplied to the amplitude recovering part D6. The recovered pitch information is supplied to the audio sound waveform recovering part D8.

When subband data or fricative information are supplied by the arithmetic code decrypting part D2, the data attaching composition extracting part D3 will judge whether a fricative flag is attached to the data supplied from the arithmetic code decrypting part D2 (a subband data or a fricative information). If it is judged that no fricative flag is attached (i.e. the data are a subband data), the modulation wave composition that expresses the attaching data are separated from (n+1) data constructing this subband data. In this way, this modulation wave and the subband data before this modulation wave has been added are extracted. The extracted subband data are supplied to the nonlinear reverse-quantizing part D5 and the extracted modulation wave is supplied to the demodulating part D4.

The technique for separating a modulation wave and a subband data can vary. For example, in the case when the modulation wave composition only substantially exists at a band exceeding the cut-off frequency of the band limiting part 44, the attaching data extracting part D3 respectively filter the (n+1) data constructing the subband data supplied from the arithmetic code decrypting part D2, as a result, a higher band composition with a frequency exceeding this cut-off frequency and a lower band composition with a frequency not exceeding this cut-off frequency can be obtained. The obtained higher band composition is treated as a modulation wave that expresses the attaching data and supplied to the demodulating part D4. The obtained lower band composition is treated as subband data and supplied to the nonlinear reverse-quantizing part D5.

On the other hand, if it is judged that a fricative flag is attached to the data supplied from the arithmetic code decrypting part D2 (i.e. the data are fricative information), the attaching data composition extracting part D3 will supply this fricative information to the nonlinear reverse-quantizing part D5.

When the modulation wave that expresses attaching data are supplied from the attaching data composition extracting part D3, the demodulating part D4 demodulates this modulation wave to recover the attaching data and outputs the recovered attaching data.

Moreover, the demodulating part D4 can also be constructed by a control circuit that controls the serial communication with outside or the parallel communication with outside. The demodulating part D4 can also comprise a display device such as a Liquid Crystal Display for showing the attaching data. Moreover, the demodulating part D4 can also write the recovered attaching data to an external memory device that comprises an external recording medium or a hard disc device. In this condition, the demodulating part D4 can also comprise a recording control part that is constructed by a control circuit of a recording medium driver or a hard disc controller.

When subband data (or a fricative information) is supplied from the attaching data composition extracting part D3 and when the compression characteristic data are supplied from the arithmetic code decrypting part D2, the nonlinear reverse-quantizing part D5 will change the instantaneous value of each frequency composition expressed by this subband data (or the strength of each composition of the spectrum that expressed by a fricative information) according to a characteristic which is a reverse-transformation to the compression characteristic expressed by this compression characteristic data. In this way, data corresponding to the subband data (or fricative information) before they have been nonlinearly quantized are generated. The generated subband data are supplied to the amplitude recovering part D6. The generated fricative information is converted into an audio sound data by using a reverse-Fourier Transformation and the converted fricative information is supplied to the audio sound output part D9. Moreover, the discrimination between the subband data and the fricative information is based on whether a fricative flag exists and the discrimination is produced in the same manner as the attaching data composition extracting part D3, for example. The Fast-Reverse-Fourier Transformation can also deal with the same procedure as the cepstrum analyzing part 22 of the encoder EN.

When subband data are supplied from the nonlinear quantizing part D5 and rate constant data are supplied from the arithmetic code decrypting part D2, the amplitude recovering part D6 changes the amplitude by multiplying the reciprocal number of the rate constant expressed by this rate constant data to the instantaneous value of this subband data. The subband data that make the amplitude change are supplied to the subband data compounding part D7.

When the subband data that makes the amplitude change is supplied from the amplitude recovering part D6, by transforming this subband data, the subband compounding part D7 recovers the pitch-waveform data that express the strength of each frequency composition of this subband data. The recovered pitch-waveform data are supplied to the audio sound waveform recovering part D8.

The transforming of the subband data by the subband compounding part D7 is substantially a reverse-transformation with respect to the transformation of the audio sound data for this subband data. In the case when these subband data are generated by the orthogonal transforming part 41 of the encoder EN, the subband compounding part D7 can be reverse-transformed with respect to a transforming by the orthogonal transforming part 41. More specifically, in the case when this subband is generated by transforming its audio sound element with a DCT, the subband compounding part D7 can transform these subband data with an IDCT (Inverse DCT).

The audio sound waveform recovering part D8 changes the time interval of each region of the pitch-waveform data supplied from the subband compounding part D7 into a time interval expressed by a pitch information that is supplied from the arithmetic code decrypting part D2. The changing of the time interval of the region can be produced by changing the interval of samples and/or the number of samples.

The audio sound waveform recovering part D8 supplies the pitch waveform data (i.e. the audio sound data that express a recovered audio sound) with a changed interval of each region to the audio sound output part D9.

The audio sound output part D9 comprises a control circuit that is functional as a PCM decoder, a D/A (Digital-to-Analog) converter, an AF (Audio Frequency) amplifier and a speaker, etc.

When audio sound data that express a recovered audio sound is supplied from the audio sound waveform recovering part D8 or when an audio sound data that express a recovered fricative is supplied from the nonlinear quantizing part D5, the audio sound output part D9 will demodulate these audio sound data and make a D/A converting, amplifying them, and then reproduce audio sound by driving a speaker by using the obtained analog signal.

With the above operation, by using this audio sound application system (encoder EN), attaching data can be embedded into an audio sound and the embedded attaching data can be extracted out of the audio sound data.

Because the embedding of the attaching data is produced by changing the time-varying-strength of the basic frequency composition or higher frequency composition of the audio sound data, it differs from the embedding of the data of a conventional electronic watermark technique. Even though data embedded with attaching data are compressed, it is still difficult to damage the attaching data.

Moreover, human hearing is not sensitive to the time-varying-strength of the basic frequency composition or higher harmonic frequency composition of the audio sound data and the lack of the higher harmonic compression of the audio sound data. Therefore, a recovery audio sound that is recovered according to the audio sound data embedded with attaching data by this audio sound data application system (encoder EN) and a compound audio sound that is compounded according to the subband data the higher harmonic composition eliminated by the audio sound data application system (encoder EN) sounds with few foreign sounds to the hearing.

The compound audio sound that is compounded by using subband data saved in an audio sound database DB has eliminated partial higher harmonic composition of the audio sound element constructing this compound audio sound. Therefore, by judging whether a partial higher harmonic composition of the audio sound element constructing this compound audio sound is eliminated, it can recognize whether this audio sound is made by a compound audio sound or a real person.

Furthermore, this audio sound data application system is not limited to the above description.

For example, the audio sound data input part 1 of the encoder EN can obtain the external audio sound through a communication line such as a telephone line, a leased line and a satellite circuit. In this condition, the audio sound data input part 1 can comprise a communication control part that is constructed by a modem or a DSC (Data Service Unit), etc.

Moreover, the audio sound data input part 1 can also comprise an audio-sound-collecting device that is constructed by a microphone, an AF (Audio Frequency) amplifier, a sampler, an A/D (Analog-to-Digital) converter and a PCM encoder etc. The audio-sound-collecting device amplifies the audio signal expressing an audio sound that has been collected through its own microphone, and then re-samples it to the A/D converter. After that, by PCM-modulating the re-sampled audio signal, the audio-sound-collecting device obtains an audio sound data. Moreover, the audio sound data obtained by the audio sound data input part 1 do not need to be a PCM signal.

Moreover, the band deleting part 51*b* is capable of storing the deleting band table that is changeable. Each time when changing the speaker who makes an audio sound expressed by the audio sound data supplied to the audio sound input data input part 1, the earlier stored deleting band table is eliminated from the band deleting part 51*b*. If the deleting band table that is characteristic of this speaker is newly stored in the band deleting part 51*b*, an audio sound database DB that is particularly possessed by speakers can be constructed.

Furthermore, for example, the blocking part 43 obtains an audio sound label from the audio sound data input part 1 and judges whether the subband data supplied by itself represents a fricative according to the obtained audio sound label.

The pitch extracting part 2 can also be constructed without a cepstrum analyzing part 22 (or a auto-correlation analyzing part 23). In this condition, the weight calculating part 24 can deal with the reciprocal number of the basic frequency obtained by the cepstrum analyzing part 22 (or the auto-correlation analyzing part 23) as an average pitch.

The waveform correlation analyzing part 27 can also treat the pitch signal supplied from the band pass filter 26 as a zero-cross signal and then supply it to the cepstrum analyzing part 22.

That the adding part 51*a* adds a modulation wave expressing attaching data to the subband data can also be replaced by any other technique that uses this modulation wave to modulate the subband data. In this condition, the attaching data compression extracting part D3 of the decoder DEC can also demodulate this modulated subband data. In this way, the modulation wave that expresses attaching data can be extracted.

Moreover, the attaching data input part 6 can supply the obtained attaching data to the adding part 51*a*. In this condition, the adding part 51*a* can deal with the supplied attaching data itself as a modulation wave that expresses the attaching data. The demodulating part D4 of the decoder DEC can also output the data supplied from the attaching data compression extracting part D3 to be attaching data.

That the bit stream forming part 53 forms the bit stream can be replaced by writing the arithmetic code supplied from the arithmetic coding part 52 to an external memory device comprising an external recoding medium or a hard disc device etc. In this condition, the bit stream forming part 53 can comprise a record control part that is constructed by a control circuit such as a recoding medium driver or a hard disc controller.

Moreover, that the bit stream separating part D1 of the decoder DEC forms the bit stream can also be replaced by reading an arithmetic code generated by the arithmetic coding part 52 or by reading an arithmetic code with substantially the same data structure as this arithmetic code from an external memory device comprising an external recording medium or a hard disc device. In this condition, the bit stream separating part D1 can also comprise a record control part constructed by a control circuit such as a recording medium driver or a hard disc controller. The subband data that are supplied to the nonlinear reverse-quantizing part D5 by the attaching data composition extracting part D3 is not necessary to be the one eliminating the composition of a modulation wave that expresses the attaching data. The attaching data composition extracting part D3 can also supply the subband data that includes a composition of the modulation wave expressing the attaching data to the nonlinear reverse-quantizing part D5.

Although the embodiment of the present embodiment is explained as above, the audio signal processing device and signal recovering device related to this invention can be practiced by using an usual computer system without a specific system.

For example, by installing a program for practicing the operations of the above audio sound data input part 1, pitch extracting part 2, re-sampling part 3, subband analyzing part 4, data attaching part 5*a*, encoding part 5*b* and attaching data input part 6 to a computer through a medium saved with the program, the audio sound encoder EN that practices the above process can be constructed.

Moreover, by installing a program for practicing the operations of the above bit stream separating D1, arithmetic code decrypting part D2, attaching data extracting part D3, demodulating part D4, nonlinear-reverse-quantizing part D5, amplitude recovering part D6, subband compounding part D7, audio-waveform recovering part D8 and audio sound output part D9 to a computer through a medium saved with the program, the decoder DEC that practices the above process can be constructed.

Furthermore, these programs can be disclosed on a BBS (Bulletin Board System) of a communication line and can be distributed through the communication line. The carrier wave of the signal that expresses these programs is modulated. The obtained modulation wave is transmitted and then is demodulated by a device that receives the modulation wave to recover these programs.

These programs are acted under an OS control and are practiced as other application program, as a result, the above process can be practiced.

Additionally, in the case when a partial process is sheared by an OS or in the case when a partial of a constructing element is constructed by an OS, the recording medium can save the program with that portion being removed. In this condition, that recording medium can be saved with a program for practicing each function or step of a computer.

With the above explanation, according to this invention, the audio signal processing device and the method for processing an audio signal for embedding an attaching information to an audio sound under a condition that even if the audio signal is compressed, the extracting of the attaching information can be easily produced. The signal recovering device and the method for recovering an audio signal for extracting the embedded attaching information by using such an audio signal processing device and the method for processing an audio signal can be produced.

Additionally, the audio signal processing device and the method for processing an audio signal can be produced to process an audio sound information without encrypting the audio sound information. Even if the arrangement of the audio sound constructing element is changed, the speaker who makes the audio sound can be identified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An audio signal processing device, comprising:

a subband extracting means for generating a subband signal that expresses a fine-varying-strength of a basic frequency composition and a higher harmonic composition of an audio signal of a processing object that express a waveform of an audio sound, wherein the subband signal is not attached with an attaching signal;

a data attaching means for generating an information-attached subband signal expressing a result of superimposing the attaching signal that expresses an attaching information of an attaching object to the subband signal that has been generated by the subband extracting means; and a pitch waveform signal generating means for obtaining the audio signal of the processing object and processing the audio signal into a pitch waveform signal by making a time interval of a region corresponding to a unit pitch of the audio signal substantially the same, wherein the subband extracting means generates the subband signal according to the pitch waveform signal, wherein the subband extracting means comprises:

a variable filter for extracting the basic frequency composition of the audio sound of the processing object by making a frequency characteristic change according to a control and filtering the audio signal of the processing object;

a filter characteristic determining means for specifying the basic frequency of the audio sound according to the basic frequency composition that has been extracted from the variable filter and controlling the variable filter with a frequency characteristic that masks a composition out of a portion nearby the specified basic frequency;

a pitch extracting means for dividing the audio signal of the processing object into a region constructed by the audio signal in the unit pitch according to the basic frequency composition of the audio signal; and a pitch length fixing part for generating the pitch waveform signal with each time interval within the region being substantial the same by sampling each the region of the audio signal of the processing object with a substantially same number of samples.

2. The device according to claim 1, further comprising:

a filtering means for substantially deleting a composition with a frequency that is at or over a predetermined frequency in the basic frequency composition and the higher harmonic composition expressed by the subband signal by filtering the subband signal that has been generated by the subband extracting means, wherein the data attaching means generates the information-attached subband signal by superimposing the attaching signal occupying a band that is with or over the predetermined frequency to the filtered subband signal.

3. The device according to claim 1, wherein the data attaching means superimpose the attaching signal to a result of nonlinearly quantizing the filtered subband signal.

4. The device according to claim 3, wherein the data attaching means obtain the information-attached subband signal and determine a quantization characteristic of the nonlinear quantizing according to a data amount of the obtained information-attached subband signal and produce the nonlinearly quantizing corresponding to the determined quantization characteristic.

5. The device according to claim 1, further comprising:

a removing means for specifying a portion that expresses a fricative in the audio signal of the processing object and removing the specified portion out of a superimposing object of the attaching object.

6. The device according to claim 1, further comprising a recovering device comprising:

an information-attached subband signal obtaining means for obtaining the information-attached subband signal; and an attaching information extracting means for extracting the attaching information from the obtained information-attached subband signal.

7. An audio signal processing method, comprising:

generating a subband signal that expresses a time-varying-strength of a basic frequency composition and a higher harmonic composition of an audio signal of a processing object that expresses a waveform of an audio sound, wherein the subband signal is not attached with an attaching signal yet;

generating an information-attached subband signal that expresses a result of superimposing the attaching signal expressing an attaching information of an attaching object to the generated subband signal; and obtaining the audio signal of the processing object and processing the audio signal into a pitch waveform signal by making a time interval of a region corresponding to a unit pitch of the audio signal substantially the same, wherein the subband signal is generated according to the pitch waveform signal.

wherein the step of generating the subband signal comprises:

providing a variable filter for extracting the basic frequency composition of the audio sound of the processing object by making a frequency characteristic change according to a control and filtering the audio signal of the processing object;

providing a filter characteristic determining means for specifying the basic frequency of the audio sound according to the basic frequency composition that has been extracted from the variable filter and controlling the variable filter with a frequency characteristic that masks a composition out of a portion nearby the specified basic frequency;

providing a pitch extracting means for dividing the audio signal of the processing object into a region constructed by the audio signal in the unit pitch according to the basic frequency composition of the audio signal; and providing a pitch length fixing part for generating the pitch waveform signal with each time interval within the region being substantial the same by sampling each the region of the audio signal of the processing object with a substantially same number of samples.

8. The method according to claim 7, further comprising a signal recovering step by extracting the attaching information from the obtained information-attached subband signal.

* * * * *